(12) United States Patent
Fernández et al.

(10) Patent No.: US 9,853,809 B2
(45) Date of Patent: Dec. 26, 2017

(54) METHOD AND APPARATUS FOR HYBRID ENCRYPTION

(71) Applicant: The Board of Regents of The University of Texas System, Austin, TX (US)

(72) Inventors: Benito R. Fernández, Austin, TX (US); José R. Capriles-Grané, Austin, TX (US); Michael D. Bryant, Austin, TX (US); John W. Hall, Austin, TX (US); Carlos A. García, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 0 days.

(21) Appl. No.: 15/087,422

(22) Filed: Mar. 31, 2016

(65) Prior Publication Data

US 2017/0085367 A1 Mar. 23, 2017

Related U.S. Application Data (60) Provisional application No. 62/140,984, filed on Mar. 31, 2015.

(51) Int. Cl.

| | |
|---|---|
| *H04K 1/00* | (2006.01) |
| *H04L 9/00* | (2006.01) |
| *G06F 1/04* | (2006.01) |
| *H03K 3/84* | (2006.01) |
| *H03B 28/00* | (2006.01) |
| *H03B 29/00* | (2006.01) |
| *H03B 5/12* | (2006.01) |

(52) U.S. Cl.
CPC .............. *H04L 9/001* (2013.01); *G06F 1/04* (2013.01); *H03B 5/1259* (2013.01); *H03B 28/00* (2013.01); *H03B 29/00* (2013.01); *H03K 3/84* (2013.01); *H04L 2209/12* (2013.01)

(58) Field of Classification Search
CPC .................................. H04L 9/001; H03K 3/84
USPC ........................................................... 380/28
See application file for complete search history.

(56) References Cited

U.S. PATENT DOCUMENTS

| | | | |
|---|---|---|---|
| 4,302,628 A | 11/1981 | Akrich et al. | |
| 5,592,556 A | 1/1997 | Schwed | |
| 5,654,677 A | 8/1997 | Dent | |
| 5,914,553 A * | 6/1999 | Adams | G01P 1/006 310/309 |

(Continued)

OTHER PUBLICATIONS

ISR/WO for PCT Application No. PCT/US20161025304 dated Aug. 19, 2016.

(Continued)

*Primary Examiner* — Anthony Brown
(74) *Attorney, Agent, or Firm* — Meyertons, Hood, Kivlin, Kowert & Goetzel, P.C.; Mark R. DeLuca (57) ABSTRACT

Described herein is a combination of mixed-signal hardware and software that is capable or realizing hybrid chaotic oscillators that can be tuned digitally. This includes the type/class of chaotic oscillator, initial conditions, nonlinear elements, thresholds, nonlinear event surfaces, delays, etc. At the same time, tunable methods of how to use the chaotic oscillator information to encrypt and decrypt both analog and digital information is presented. This will make the secure information not vulnerable by digital information compromises or hardware breach.

17 Claims, 8 Drawing Sheets

(56) References Cited

U.S. PATENT DOCUMENTS

| | | | |
|---|---|---|---|
| 6,018,582 A | | 1/2000 | Francois et al. |
| 6,127,899 A | | 10/2000 | Silva et al. |
| 6,624,773 B2 | | 9/2003 | Wong |
| 6,980,656 B1 | * | 12/2005 | Hinton, Sr. .......... H04L 27/001 380/257 |
| 7,454,450 B2 | | 11/2008 | Remy et al. |
| 7,555,507 B2 | | 6/2009 | Bryant et al. |
| 7,796,075 B2 | | 9/2010 | Fernandez et al. |
| 8,423,778 B2 | | 4/2013 | Mohanty |
| 8,588,424 B2 | | 11/2013 | Yamada et al. |
| 2005/0172154 A1 | * | 8/2005 | Short .................... H04H 60/23 726/5 |
| 2005/0242906 A1 | | 11/2005 | Gandhi |
| 2013/0106481 A1 | | 5/2013 | Campos et al. |

OTHER PUBLICATIONS

Alvarez et al. "Some basic cryptographic requirements for chaos-based cryptosystems," International Journal of Bifurcation and Chaos, vol. 16, pp. 2129-2151, 2006.

Cuomo et al. "Synchronization of lorenz-based chaotic circuits with applications to communications," Circuits and Systems II: Analog and Digital Signal Processing, IEEE Transactions on, vol. 40, pp. 626-633, 1993.

Daemen et al. (1993), "Weak Keys for IDEA", Advances in Cryptology, CRYPTO 93 Proceedings: 224-231.

Kocarev et al "Experimental demonstration of secure communications via chaotic synchronization," International Journal of Bifurcation and Chaos, vol. 02, No. 03, pp. 709-713, 1992.

Nakahara et al. (2002), "A note on Weak Keys of PES, IDEA and some Extended Variants".

Parlitz et al. "Transmission of digital signals by chaotic synchronization," International Journal of Bifurcation and chaos, vol. 02, No. 04, pp. 973-977, 1992.

Perez et al. "Extracting messages masked by chaos," Phys. Rev. Lett., vol. 74, pp. 1970-1973, 1995.

Pivka et al. "Chua's oscillator: A compendium of chaotic phenomena," Journal of the Franklin Institute, vol. 331, No. 6, pp. 705-741, 1994.

"Narrow-Bicliques: q Cryptanalysis of Full IDEA" Rechberger et al. http://www.cs.bris.ac.uk/eurocrypt2012/Program/Tues/Rechberger.pdf (2012).

"Slashdot: Crypto Guru Bruce Schneier Answers". slashdot.org. Retrieved Aug. 15, 2010.

* cited by examiner

METHOD AND APPARATUS FOR HYBRID ENCRYPTION

PRIORITY CLAIM

This application claims priority to U.S. Provisional Application Ser. No. 62/140,984 entitled "METHOD AND APPARATUS FOR HYBRID ENCRYPTION" filed Mar. 31, 2015, which is incorporated herein by reference in its entirety.

STATEMENT REGARDING FEDERALLY SPONSORED RESEARCH OR DEVELOPMENT

This invention was made with government support under grant # CNS1239136 awarded by the National Science Foundation. The government has certain rights in the invention.

BACKGROUND OF THE INVENTION

1. Field of the Invention

The invention generally relates to a method and apparatus (hardware, interface & software) to encrypt information in the sender device, to transmit the encrypted information via secure or insecure communication channels, and to decrypt information in the receiver device, by providing software-programmable hybrid-encrypting/decrypting hardware for the transmitting/receiving devices. The invention also generally relates to methods and software to create a secure communication protocol with such devices.

2. Description of the Relevant Art

The type and amount of information that people require to transmit information securely keeps increasing. Spies, hackers, and even governments are taping communications channels listening and trying to decipher private messages and data transmitted via electronic devices.

There is no "absolute security." The term security means that under some given assumptions about the system, no attack of a certain form will destroy specified properties.

There are many encryption/decryption algorithms and applications available in the market today, but most of them rely on digital schemes to encrypt and decrypt the information. Given enough time, these methods can be circumvented and the apparent security be compromised. There have been some attempts to create analog encryption/decryption using chaotic oscillators, but their reliability is poor and once the hardware is breached, the encryption/decryption method is exposed and compromised.

SUMMARY OF THE INVENTION

In an embodiment, a system of paired circuits capable of creating substantially identical chaotic or preprogrammed analog oscillators that are digitally tunable includes: one or more chaotic oscillators comprising a chaotic oscillation circuit comprising digital elements and a processor coupled to the digital elements, wherein the operating parameters of the one or more chaotic oscillators are tunable via the digital elements using the processor, and wherein the operating parameters of the one or more chaotic oscillators are stored in a generation key, an encryption device which encrypts information to be sent or stored, wherein the information is encrypted using an encryption key generated by the one or more chaotic oscillators using the generation key; and a decryption device which decrypts the encrypted information which is sent or stored, wherein the information is decrypted using signals generated by the one or more chaotic oscillators using the generation key.

In an embodiment, the chaotic oscillation circuit comprises: a plurality of energy-storage elements; one or more active resistors; and non-linear elements; wherein operating parameters of the non-linear elements are digitally tunable by the processor. In a specific embodiment, the non-linear element is a Chua's diode characterized a set of Chua's equations, wherein the operating parameters controlled by the processor represent parameters of the Chua's equations. The Chua's equations may be defined by a set of differential or difference equations wherein the differential or difference equations are selectable by the digital elements. The Chua's equations may be represented by a hybrid integrated circuit, wherein the coefficients of the Chua's equations are varied according to the processor. In an embodiment, the processor monitors the operation of the chaotic oscillation circuit and stores information related to characteristics of the circuit when certain conditions occur. In some embodiments, this condition is when resets that occur. In some embodiments, this condition is when the integrator signals cross specific digitally-tunable hyper-surfaces. In an embodiment, the one or more chaotic oscillators comprise nonlinearities that are digitally tunable via the digital elements.

The digital elements may be selected from the group consisting of, but not limited to, VGAs, R2R ladders, PWM, switched-capacitors, and switched transistors. The digital elements may be configured to receive external signals, wherein information regarding the external signals is stored in the generation key. In some embodiments, the initial operating parameters of the one or more chaotic oscillators are digitally tunable and resettable via the digital elements.

In an embodiment, the generation key includes initial conditions of chaotic oscillation circuit, characteristics of the nonlinear elements, and/or reset thresholds. The generation key may include one or more of the following: chaotic oscillator type, equations coefficients, initial conditions, reset thresholds, nonlinearities, and ephemeral information.

In an embodiment, the encryption key is a mantissa and exponent part of a digital part of a real number generated by the chaotic oscillator at predetermined events. In some embodiments, these event are prescribed times. In an embodiment, the encryption key is a bitstream comprising the output of the one or more chaotic oscillators. The encryption device may combine the different states of the one or more chaotic oscillators with different weights at different times to produce the encryption key. The weights and times when each signal is used may be generated by a chaotic oscillator or a pseudo-random number generator. The encryption device may obtain oscillator signals at irregular intervals to produce the encryption key. In some embodiments, the times when each signal is obtained is generated by a chaotic oscillator or a pseudo-random number generator. In some embodiments, the encryption key is created based on one or more of: voltages; currents; phases, or frequencies of a signal produced by the one or more chaotic oscillators. In some embodiments, one or more of the chaotic oscillators comprise an analog integrator which integrates a signal produced by one or more of the chaotic oscillators, wherein the integrated signal is used to create the encryption key.

In some embodiments, the encryption device uses the Advanced Encryption Standard to generate the encrypted signal. In some embodiments, the encryption device is configured to receive digital information and convert the digital information into an encrypted analog signal. In some embodiments, the encryption device is configured to receive analog information and convert the analog information into an encrypted digital signal.

The information being transmitted may be digital data, analog data or mixed data. The information may be encrypted digitally as a bitstream comprising a receiver public key and a sender private key.

In an embodiment, a tunable chaotic oscillator includes: a plurality of energy-storage elements; one or more active resistors; a non-linear element; and wherein the operating parameters of the non-linear element are digitally tunable by a processor coupled to the non-linear element. In an embodiment, the non-linear element is a Chua's diode characterized a set of Chua's equations, wherein the operating parameters controlled by the processor represent parameters of the Chua's equations. The Chua's equations may be represented by a hybrid integrated circuit, wherein the coefficients of the Chua's equations are varied according to the processor. In an embodiment, the equations used are Linsay's RLD, characterized a set of differential equations, wherein the operating parameters of the digitally-tunable resistor-inductor-diode components are controlled by the processor. In an embodiment, the equations used are Linsay's RLD, characterized a set of differential equations, wherein the digitally-tunable resistor-inductor-diode components have non-linear characteristics and are digitally tunable.

In an embodiment, a tunable chaotic oscillator includes: a plurality of energy-storage elements; one or more active resistors; a non-linear element; circuit components that add time delays; and wherein the operating parameters of the components are digitally tunable by a processor coupled to them.

In some embodiments, the chaotic oscillators are one or more of a set: Chua's oscillators, Colpitts oscillators, Linsay's oscillators, Van der Pol's oscillators, Lorenz's oscillators, etc.

In some embodiments, the set of Chua's equations are represented by the set of equations (9):

$$\dot{x} = \alpha(y - x - f(x))$$

$$\dot{y} = x - y + z$$

$$\dot{z} = -\beta y \quad (9)$$

where $\alpha$ and $\beta$ and are constant parameters, x, y, and z are state variables and f(x) is the function (10):

$$f(x) = m_1 x + \frac{1}{2}(m_0 - m_1)(|x + 1| - |x - 1|) \quad (10)$$

wherein the operating parameters of the Chua's diode are the parameters $\alpha$, $\beta$, $m_0$, $m_1$ or the state variables x, y, and z.

In an embodiment, a data transmission system includes:
an encryption system comprising: an encryption tunable chaotic oscillator; and an encryption device which combines an encryption key generated from chaotic signals produced by the tunable chaotic oscillator with data being transmitted by the data transmission system to form encrypted data, wherein the chaotic signals are produced under operating parameters which are stored in a generation key; and
a decryption system comprising: a decryption tunable chaotic oscillator capable of producing chaotic signals substantially identical to the chaotic signals produced by the encryption tunable chaotic oscillator when operating under the operating parameters stored in a generation key; and a decryption device which removes the encryption key from the encrypted data to produce the data being transmitted.

In an embodiment, the herein the encryption and decryption tunable chaotic oscillators are Chua's oscillators.

The system may also include a cloud-based server coupled to the encryption system and the decryption system, wherein the generation key is stored in the cloud-based server. In some embodiments, a cloud-based server is used to connect a transmitter of the data with a receiver of the data, wherein the encryption system and the decryption system are embodied in the cloud-based server.

In an embodiment, a method of transmitting encrypted data comprises:
sending data to an encryption system, wherein the encryption system comprises: an encryption tunable chaotic oscillator; and an encryption device which produces encrypted data;
encrypting the data using the encryption system by combining the data with an encryption key generated from chaotic signals produced by the tunable chaotic oscillator, wherein the chaotic signals are produced under operating parameters which are stored in a generation key;
sending the encrypted data and the generation key to a decryption system, wherein the decryption system comprises: a decryption tunable chaotic oscillator capable of producing chaotic signals substantially identical to the chaotic signals produced by the encryption tunable chaotic oscillator when operating under the operating parameters stored in a generation key; and a decryption device which removes the encryption key from the encrypted data to produce the data being transmitted; and
removing the encryption key from the encrypted data to obtain the unencrypted data.

In an embodiment of an encryption system, part of the generating key is hardwired at manufacturing and only the manufacturer will have knowledge of it. In some embodiments, the generating key of two "paired" devices are hardwired at manufacturing using a TRNG (True Random Number Generator) such that no one retains knowledge of the manufacturing parameters.

In an embodiment, a system of hybrid circuits capable of realizing chaotic oscillators that are digitally tunable comprises:
one or more chaotic oscillators comprising a hybrid chaotic oscillation circuit comprising digital elements and a processor coupled to the digital elements, wherein the operating parameters of the one or more hybrid chaotic oscillators are tunable via the digital elements using the processor, and wherein the operating parameters of the one or more chaotic oscillators are stored in a generation key,
wherein the one or more chaotic oscillators generate a pseudo-random number as an (infinite) encryption key based on the information of the chaotic oscillator hybrid simulation.

In an embodiment, the pseudo-random number is digitally selectable and includes but is not restricted to mantissa and exponent of the digital part of the real number at prescribed times (these can be at fixed intervals, when a certain number of resets occurs, from another sequencer, from an external source, etc.). In another embodiment, the pseudo-random number is digitally selectable and includes but is not restricted to specific times encoded in the generation key or at times prescribed by a pseudo-random number generator (PRNG), the times at which a certain number of resets occur, a Poincare Map at nonlinear hyper-surfaces, described and tuned digitally, etc. In another embodiment, the pseudo-random number is digitally selectable and includes but is not restricted to specific times where certain (digitally selectable) signal(s) cross, in a specific direction digitally-tunable nonlinear hyper-surfaces. The bit pattern generated varies for each hyper-surface and is specified in the generation key.

BRIEF DESCRIPTION OF THE DRAWINGS

Advantages of the present invention will become apparent to those skilled in the art with the benefit of the following detailed description of embodiments and upon reference to the accompanying drawings in which.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Described herein is a method and apparatus (hardware, interface & software) to encrypt information in the sender device, to transmit via secure or insecure communication channels, and to decrypt information in the receiver device, by providing software-programmable hybrid-encrypting/decrypting hardware for the transmitting/receiving devices, and a methodology and software to create a secure communication protocol with such devices. This is accomplished by a combination of mixed-signal hardware and software that is capable or realizing hybrid chaotic oscillators that can be tuned digitally. This includes the type/class of chaotic oscillator, initial conditions, nonlinear thresholds, etc. At the same time, tunable methods of how to use the chaotic oscillator information to encrypt and decrypt both analog and digital information is presented. This will make the secure information not vulnerable by digital information compromises or hardware breach.

Figure 1:
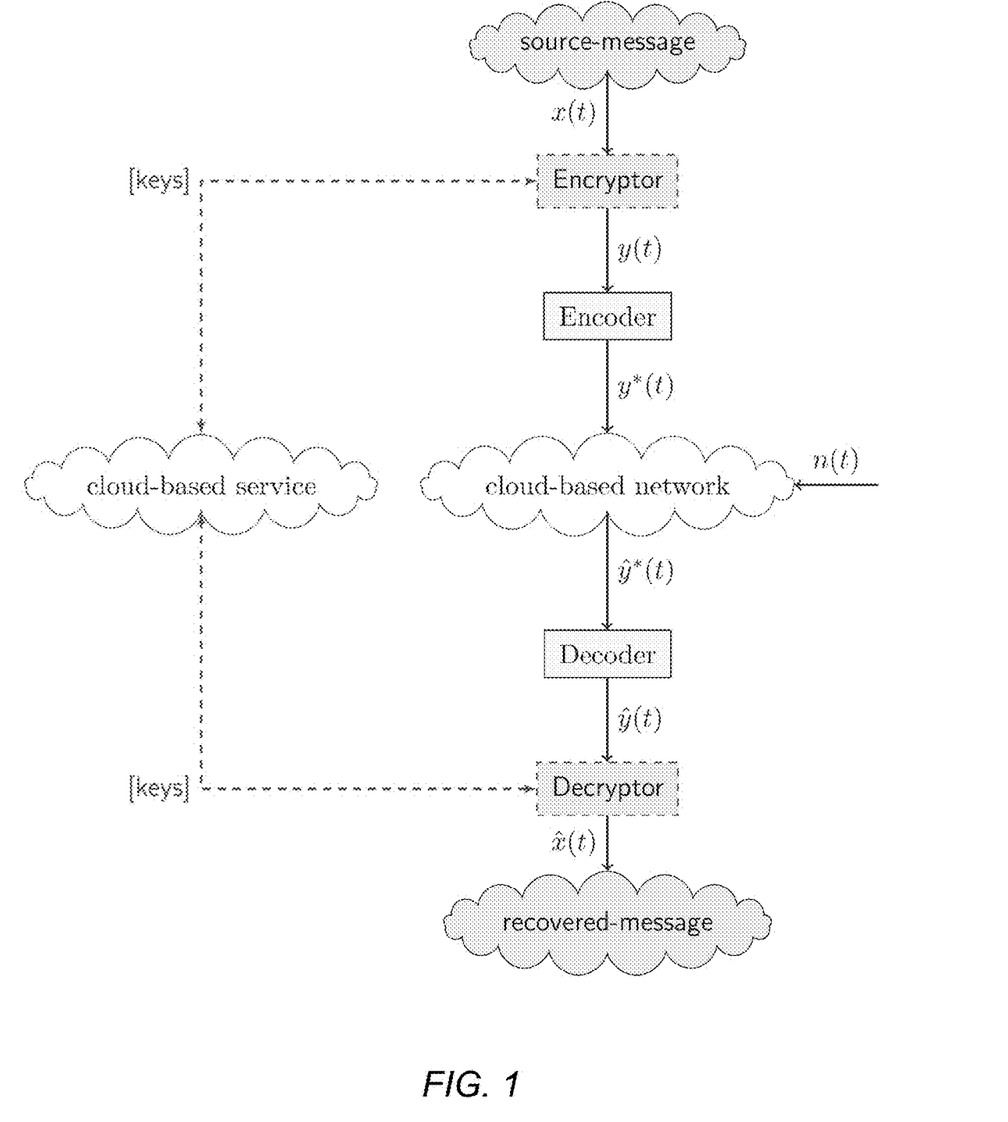
FIG. 1 is a diagram of a typical hardware implementation of the hybrid encryption algorithm.

An embodiment of the encryption system is depicted in FIG. 1. The encryption system includes an encryptor-chip, a decryptor-chip, and a transmission protocol.

(1)—The encryptor-chip takes in analog or digital information, henceforth called source-message (raw/original), x(t), and additional information from the transmission protocol (e.g., key(s), cloud services, synchronization tools, etc.) and, via the use of a field-programmable hybrid encryption (FPHE) circuit (mixed-signal), creates a chaotic oscillator (or combines the signal of a set of oscillators) and fuse (aggregate, combine, and any other method of encryption) them into an unintelligible signal, henceforth called encrypted-message, y(t).

(2)—The encrypted-message is transmitted following the transmission protocol via some encoding mechanism as a (encoded) transmitted-message, y*(t), through an unsecured (or secured) channel During the transmission, noise is added by the communication channel and the receiver gets, the (encoded and transmitted) received-message, ŷ*(t), which is decoded and the decoded encrypted-message is recovered, ŷ(t).

(3)—A decryptor-chip will take the encrypted-message (received and decoded) and additional information from the transmission protocol (e.g., key(s), cloud services, synchronization tools, etc.) and via the use of a field-programmable hybrid encryption (FPHE) circuit (mixed-signal) creates a chaotic oscillator ("similar" to the one used in the encryptor-chip) and extract, using the decoded encrypted-message, the original source-message—henceforth called recovered-message, x̂ (t).

The recovered-message is identical to the source-message. The processes {1, 2, 3} could be repeated several times or used in a relay fashion via Cloud services.

In an embodiment, a chaotic oscillator comprises a chaotic oscillation circuit comprising digital elements and a processor coupled to the digital elements, wherein the operating parameters of the one or more chaotic oscillators are tunable via the digital elements using the processor. The chaotic oscillator is a hybrid circuit which includes tunable analog components coupled to tunable digital elements. Examples of hybrid circuits are disclosed in the following U.S. patents and patent applications, all of which are incorporated herein by reference: U.S. Patent Application Publication No. 2006/0117083 published Jun. 1, 2006; U.S. Pat. No. 7,454,450 issued Nov. 18, 2008; U.S. Pat. No. 7,555,507 issued Jun. 30, 2009; and U.S. Pat. No. 7,796,075 issued Sep. 14, 2010. In these patents, hybrid circuits are described in which the basic cell includes an integrating differential (or fully-differential) operational amplifier with a couple of capacitors per side (the fully-differential mode needs four capacitors). The capacitors are used as a measuring cup (threshold/capacity adjustable via software), that we call the analog bit and represents a fraction of the least-significant bit of the mantissa of a floating-point representation. As such, every time the capacitor's charge reaches the positive and negative thresholds, the (charging) capacitor is switched by an empty (discharged) capacitor, and in turn the previously charging capacitor is reset (discharged). With the reset action, the "mantissa" is incremented or decremented according to whether the upper or lower threshold was reached that triggered the reset. Both the upper (positive) and lower (negative) thresholds can be set via digital signal of a R2R-ladder (or DAC or some other form of digitally setting a voltage or current threshold). This integrating-with-reset-cell (IRC) represents a "state" of a dynamic system of differential equations.

Figure 7:
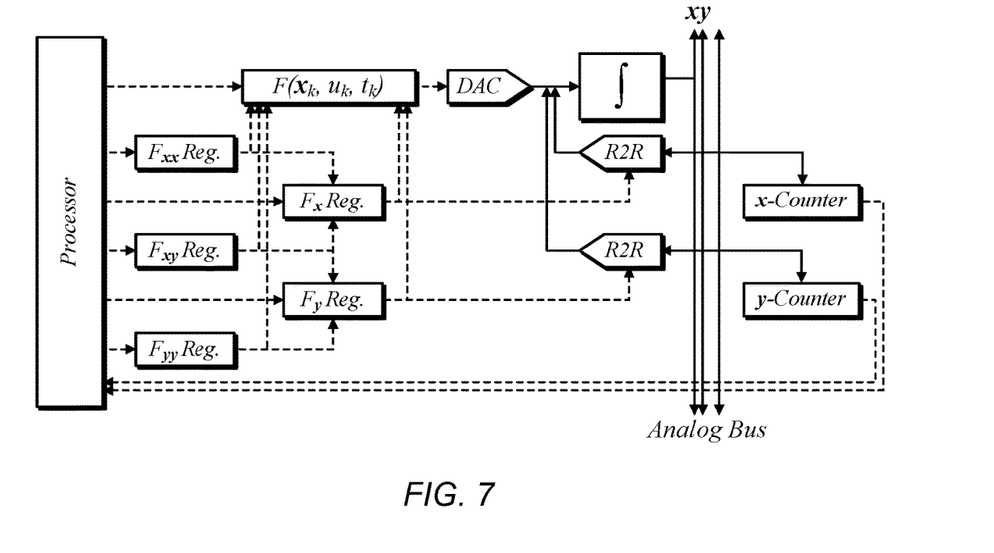
FIG. 7 shows Taylor approximation hardware using a hybrid circuit.

Adapting these systems to a chaotic oscillator, each IRC-cell is combined with others via an interconnectivity fabric (ala FPGA—Field-Programmable Gate Array, FPAA—Field-Programmable Analog Array) through R2R (resistor-resistor) ladders that are tunable by digital means and represent the coefficients of the differential equations that describe the oscillator. In the case of nonlinear ODEs (Ordinary Differential Equations), either using a Taylor-expansion approximation (as discussed in U.S. Pat. No. 7,454,450) or via artificial neural-network hybrid circuitry (as discussed in U.S. Pat. No. 5,479,571 issued December 1995, which is incorporated herein by reference, or some other means of representing the nonlinearity in voltage or current circuits is used. FIG. 7 shows an example of approximating the nonlinearity using a Taylor-Expansion series. Some nonlinearities (e.g., sign( ), absa( ), etc.) can be implemented more cleanly using diodes or transistors directly. Thus, in some embodiments, some of these components are available as an FPAA to be able to realize some of them and use them in the ODEs.

The values of all the R2R-ladders represents a stream of bits that may be part of the encryption key of the system. Additional information might be added to the encryption key in a predefined form, such as temporal and ephemeral information (e.g., time of transmission, geolocation/GPS data, City, State, Time Zone, Price (opening/closing) of a given stock at a given time, Temperature (high/low) of a given location, etc.). The ephemeral information can be specified in the generation key or predetermined by the communicating parties.

In addition, circuitry to halt the integration, reset to pre-specified initial conditions (pre-set by DACs or other mechanisms), and run is added to the chaotic oscillators. Note that in general, the positive and negative sides of a fully-differential amplifiers may not be symmetric, adding to the degree of complexity and how hard it might be to "break" the system. That is, decreasing it's vulnerability to hacking. Further, circuitry with tunable delays may be added to the feedback signals of the oscillators.

During use, the operating parameters of the one or more chaotic oscillators are stored in a generation key. An encryption device is used to encrypt information to be sent or stored. The information is encrypted using an encryption key generated by the one or more chaotic oscillators using the generation key. A decryption device decrypts the encrypted information which is sent or stored. The information is decrypted using signals generated by one or more chaotic oscillators which are operated using the generation key.

The ODE(s) to be represented in the circuit(s) can varied according to the particulars of a given implementation. In an embodiment, one or more chaotic oscillators are used to generate the "deterministic" chaotic (random) signal(s) that would be used for the encryption. In the case of multiple sets of ODEs, how they are used could also be part of the "generation key" of the system. For example, we could use one of the states ($x_k$) of one of the oscillators ($O_j$) for a period of time ($T_i$), then switch to a different state-oscillator pair for a different time interval. Which oscillator, state, time interval set sequence used, can be generated by a DRBG (Deterministic Random Bit Generator), which mechanisms and parameters are, as well, part of the generation key.

The generation key transmission (private/public) can be handled via cloud services using standard encryption protocols. In a particular implementation, a cloud service is used such that there are two sets of public/private keys, each between the {sender|receiver} clients and the Cloud server. This way, the sender and receiver are never in direct communication; the Cloud server acts as proxy for their communication.

The chaotic oscillator circuits are used to generate continuous chaotic oscillator signals. They in turn are used to generate an infinite-length, deterministic sequence that can be used as an encryption key for encryption. The encryption key can be reproduced by having a similar circuit at the receiving end that can generate (synch) the same encryption key. This is possible by sharing the generation key between the participants of the communication.

Chua's Oscillator—the Equations

Figure 2:
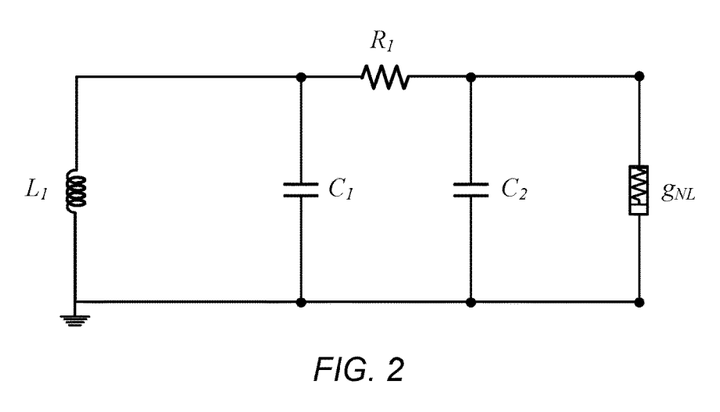
FIG. 2 is a diagram that shows a schematic diagram of Chua's oscillator circuit.

FIG. 2 depicts a schematic diagram of a Chua's oscillator. The Chua's oscillator can be described by the following equations:

$$\dot{v}_1 = [1/(R^*C_1)]((v_2-v_1)-R^*g(v_1)) \tag{2a}$$

$$\dot{v}_2 = [1/(R^*C_2)](v_1-v_2+R^*i_L) \tag{2b}$$

$$i_L = [1/(L)](-v2) \tag{2c}$$

where, $$g(x) = \begin{cases} m_0 x + (m_0 - m_1)E_1, & \text{if } x \leq -E_1 \\ m_1 x, & \text{if } -E_1 < x < E_1 \\ m_0 x + (m_1 - m_0)E_1, & \text{if } E_1 \leq x \end{cases} \tag{3}$$

A Chua's oscillator is composed of, at a minimum, of: one or more nonlinear elements (or piece-wise linear elements), one or more locally active resistors, and three or more energy-storage elements. The basic Chua's oscillator is a third-order dynamic system with two capacitors ($C_1$, $C_2$) and one inductor ($L_1$) and a non-linear element ($g_{NL}$). The non-linear element characteristics are shown in the graph depicted in FIG. 3.

Figure 4:
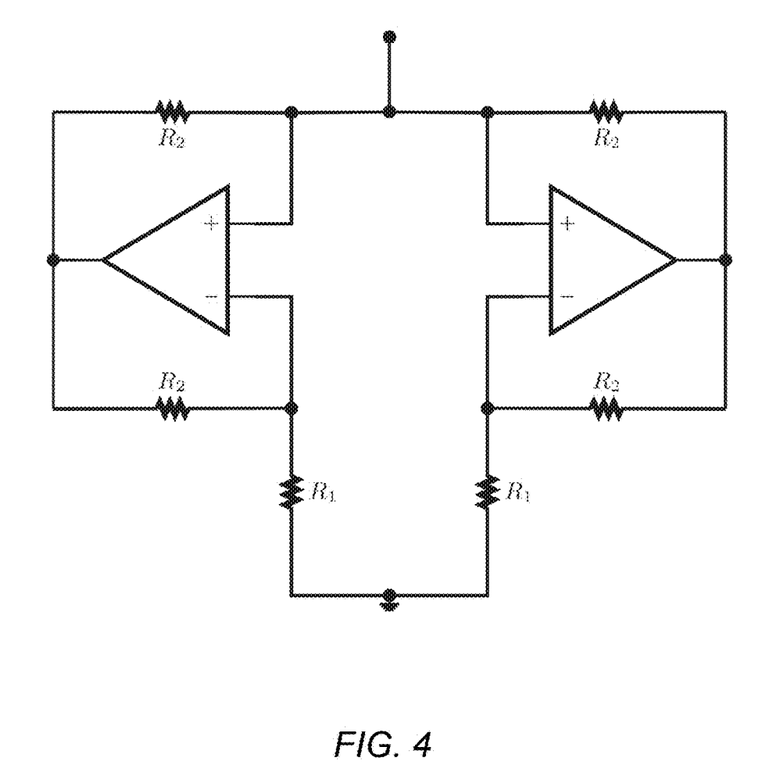
FIG. 4 is a block diagram showing a possible circuit to realize Chua's equivalent diode.
Figure 5:
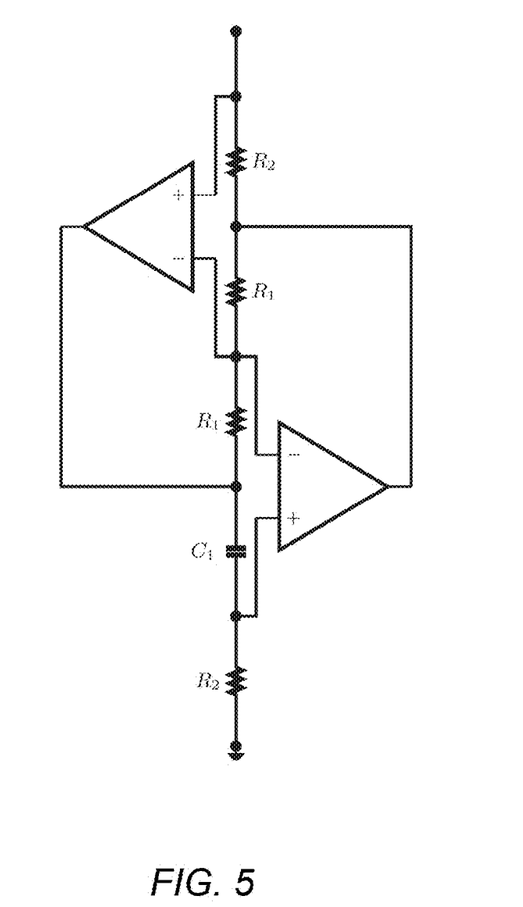
FIG. 5 is a block diagram showing a possible circuit to realize Chua's inductor equivalent circuit.
Figure 6:
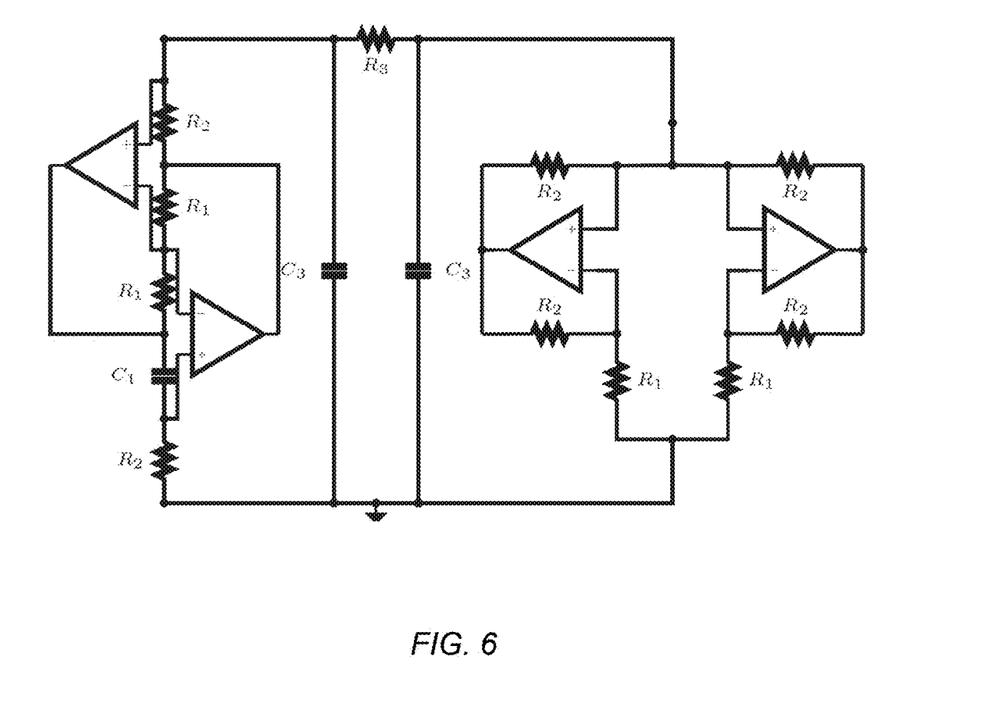
FIG. 6 is a block diagram showing a possible circuit to realize Chua's chaotic oscillator circuit.

FIG. 4 shows an equivalent circuit of the diodes that generate the nonlinearity using operational amplifiers. FIG. 5 shows operational transconductance amplifiers and a capacitor as a "gyrator" equivalent of the inductor. Finally, FIG. 6 shows the equivalent circuit for FIG. 2 but replacing the inductor and the non-linear element with the circuits of FIGS. 4 and 5, respectively.

Equations (2) can be written in a more general form as:

$$\dot{x}_1 = a_{11} \cdot x_1 + a_{12} \cdot x_2 + b_1 \cdot g(x_1) \tag{4a}$$

$$\dot{x}_2 = a_{21} \cdot x_1 + a_{22} \cdot x_2 + a_{23} \cdot x_3 \tag{4b}$$

$$\dot{x}_3 = a_{32} \cdot x_2 \tag{4c}$$

In our realization, henceforth called $H_XC$ (Hybrid eXtreme Computer), uses patented (U.S. Pat. No. 7,555,507) hybrid integrator circuits to embed the same equations (2a-2c). The hybrid Chua's oscillator would have similar ODEs (Ordinary Differential Equations) but the coefficients of the equations are field-programmable via software. This would allow for the same circuit to express or realize this and other chaotic oscillators with different coefficients on the fly. This adds a layer of security in the sense that even if the hardware is compromised (someone can reproduce or obtain a copy of the hardware) the oscillator needs digital information to generate the appropriate chaotic signal. In some embodiment, the $H_XC$ also provides mechanisms to change the initial conditions of the ODEs, increasing the complexity of the possible hacker many-folds.

Note that equations Eq. (3) can be generalized to any number of linear segments and they don't need to have origin symmetry. In addition, note that Eq. (3) is piece-wise linear and continuous. We can generalize it to have piece-wise nonlinear segments that need not be continuous across segments (or regions for multi-dimensional nonlinearities). As such, a more general formulation is:

$$\dot{x}_i = a_i x + b_i \cdot g_i(x); \forall i=1,2,\ldots,n, x \in \mathbb{R}^n.$$

$$g_i(x) = \gamma_i(x); \forall x \in \mathcal{R}_i, \mathcal{R}_i \subset \mathbb{R}^n. \quad (5)$$

where, $R_i$ is the region on $R^n$ where $g_i(x)$ is defined as $y_i(x)$, a nonlinear smooth function (at least in $R_i$). If not, it can be further subdivided into smaller regions.

Chua's Oscillator

Chua's oscillator remains the only real physical object in which chaos has been observed numerically and experimentally, and its robustness has been proved mathematically. This system relies in a remarkable simple underlying circuit to create its chaotic behavior.

Chua's circuit (FIG. 2) was proven to be capable of reproducing all possible dynamical phenomena from a certain class of 3D vector fields. As a consequence, Chua's oscillator can be used to mimic the behavior of other piecewise-linear oscillators and also approximate the behavior of many others which exhibit smooth non-linearities. FIG. 2 shows a diagram of the oscillator.

The circuit is composed by three energy storage elements: two capacitors (labeled $C_1$ and $C_2$) and an inductor (labeled L). The circuit also has an active resistor (labeled R) and a nonlinearity (Chua's diode). Chua's diode is not sold commercially but is implemented in various ways with active circuits components. The state equations of this system are given by:

$$\dot{V}_{C_1} = \frac{1}{C_1}\left(\frac{1}{R}(V_{C_2} - V_{C_1}) - f(V_{C_1})\right) \quad (6)$$

$$\dot{V}_{C_2} = \frac{1}{C_2}\left(\frac{1}{R}(V_{C_1} - V_{C_2}) + i_L\right)$$

$$i_L = -\frac{V_{C_2}}{L}$$

Figure 3:
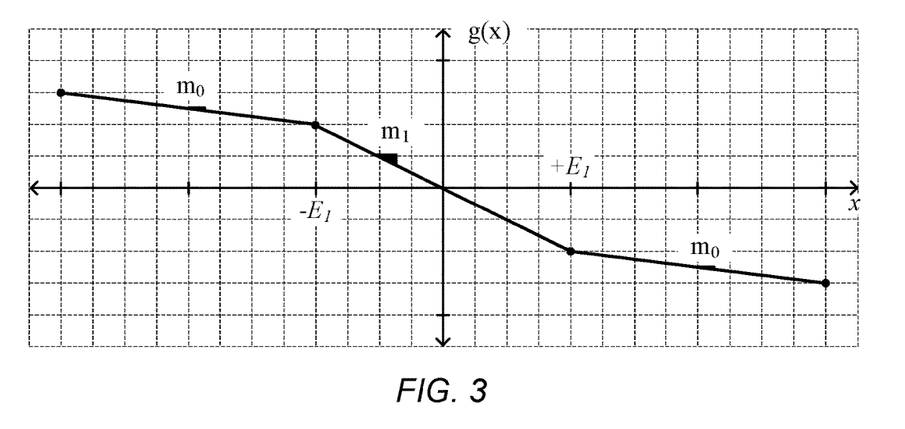
FIG. 3 is a diagram that shows an example of the nonlinearity of Chua's oscillator circuit, $g_{NL}$ of FIG. 2.

The 3 state variables are: $V_{C_1}$—the voltage across the capacitor $C_1$ (referred to herein as X); $V_{C_2}$ is the voltage across the capacitor $C_2$ (referred to herein as Y), and $i_L$ is the current through the inductor (referred herein as Z). $f(V_{C_1})$ is the output to the Chua's diode (see FIG. 3) and it is equal to:

$$f(x) = \begin{cases} m_0 v_1 + (m_0 - m_1)E_1, & \text{if } v_1 \geq -E_1. \\ m_1 x, & \text{if } -E_1 < x < E_1. \\ m_0 v_1 + (m_1 - m_0)E_1, & \text{if } 1 \leq x. \end{cases} \quad (7)$$

where, $m_0$ and $m_1$ are the slopes of the outer and inner regions in the Chua's diode.

There are many variations on how to build the Chua's circuit shown in FIG. 2. The non-linear resistor can be made from only resistors and op-amps (FIG. 4). The inductor can also be replaced by an additional circuit called a gyrator (FIG. 5). Typically, a gyrator transforms a capacitive load into an inductance. At low frequencies and low powers, the behavior of the gyrator can be reproduced by a small op-amp circuit. Thus, a Chua's circuit can be constructed from op-amps, resistors and capacitors. A final design of the Chua's circuit using discrete components can be seen in FIG. 6.

When using a gyrator to simulate the inductor, to obtain the measurement of $I_L$, the voltage between $R_3$ and $R_4$. The actual current through the simulated inductor can be calculated by:

$$i_L = (V_{R_3 R_4} - V_{C_2})/R_7 \quad (8)$$

Digital Chaotic Encryption Embodiment

To overcome the synchronization problem, a numerical evaluation of chaos can be used since in this case, the parameter mismatch does not exist. The state equations of Chua's oscillator eq (6) can be modified by a simple change of variables and it can be represented into a set of dimensionless equations as follows:

$$\dot{x} = \alpha(y - x - f(x))$$

$$\dot{y} = x - y - z$$

$$\dot{z} = -\beta y \quad (9)$$

Where $\alpha$ and $\beta$ are constant parameters and f(x) is the characteristic function of the system (Chua's diode output) shown in FIG. 3). The equation controlling the characteristic function of Chua's diode is defined as follows:

$$f(x) = m_1 x + \frac{1}{2}(m_0 - m_1)(|x+1| - |x-1|) \quad (10)$$

Where $m_0$ and $m_1$ are the slopes of the outer and inner regions in FIG. 3.

The system of equations in Eq. (9) has several different solutions depending on the parameters $\alpha$ and $\beta$ and the initial conditions. By using $\alpha=15.6$ and $\beta=40.5$ the system generates a common harmonic oscillator. In this case the trajectory represents a limit cycle. By using $\alpha=15.6$ and $\beta=100.5$ we obtain the stable system with a stable attractor. By further modifying this set of parameters, it is possible to configure the oscillator to achieve the expected chaotic behavior. For example, by using $\alpha=15.6$ and $\beta=25.58$ we were able to obtain a double-scroll Chua's attractor. Here the trajectory randomly traverses and circles around two different virtual states. Different chaotic system can be obtained by using different sets of parameters, as an example, by using $\alpha=25.6$ and $\beta=50.5$ we are able to obtain a different chaotic system. Furthermore, each set of initial condition and parameters can be compared to a new seed in a digital pseudo random number generator.

Digital Image Encryption Using Chua's Oscillator

In this section, a simple example of a chaotic cryptosystem using the Chua's model is described. The encryption system chosen belongs to the symmetric cryptosystems and can be used to cipher various kinds of plain-texts (text files, pictures or sound).

The Chua's system is employed in the key generation scheme in order to control the generation of the pseudo-random cipher key. The generated key is obtained from the solution of the ODEs in equation (9) and it is used in this encryption scheme as a binary sequence.

In a single encryption cycle a group of pixel values (corresponding to 32 bits) is ciphered using a pseudo random value obtained from one of the three chaotic state variables of the model of Chua's circuit (X, Y or Z). The samples of the plaintext, cyphertext and the secret keys are values, represented in double precision. In this system, the secret key between the transmitter and receiver is composed of the values of the Chua's circuit parameters: $m_0$, $m_1$, $x(0)$, $y(0)$, $z(0)$, $\alpha$, $\beta$ and the nonlinear function used.

The complete image's encryption/decryption process consists of two steps:

First, a new chaotic key is generated from the previous key, by solving the next step of the ODEs. The output of this step is a new sequence of 32 bits per variable (X, Y and Z). This correspond to the new key.

Second, the encryption is performed by a XOR operation. In this case, a group of image pixels is XORed with the selected key.

The decipher procedure is similar to the encipher process presented above but with a reverse order of operation. Since both decipher and encipher procedures have similar structures, they have essentially the same algorithmic complexity and time of operation. The decryption is sample is only equal to the original sample if the generation key used at decryption equals the generation key used by encryption.

To increase the strength of the encryption this process can be repeated N times. In this case, N become part of the generation key too. Also, it's possible to increase the robustness of the cyphertext by adding an extra layer of encryption that involves a disorder of the pixels first. This type of encryption can also be added as an additional encryption scheme after a standard encryption using algorithms such as Advanced Encryption Standard ("AES").

Figure 8:
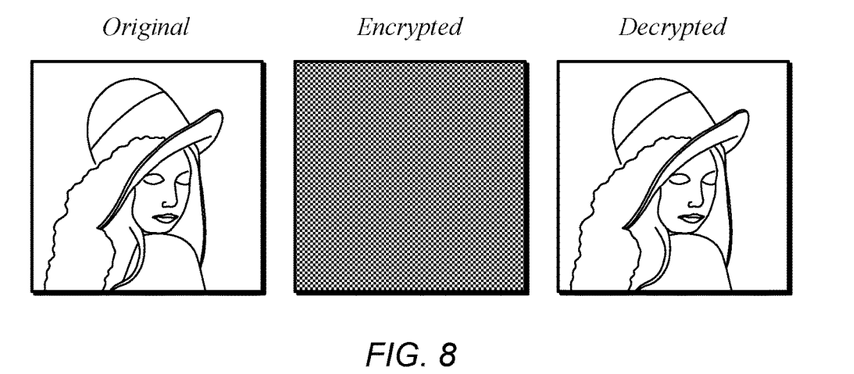
FIG. 8 shows an example of Image Encryption-Decryption.
Figure 9:
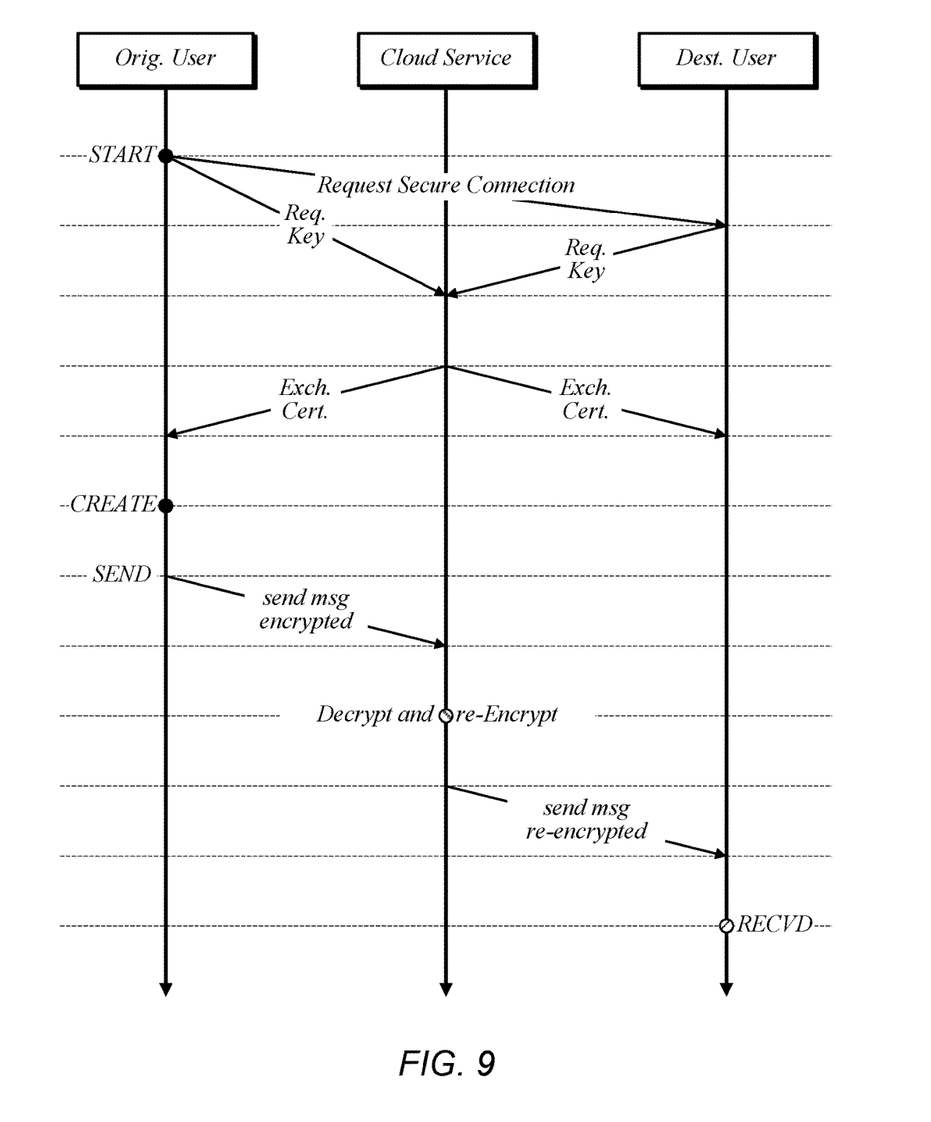
FIG. 9 shows a time sequence diagram with HxE embedded and cloud services.
Figure 10:
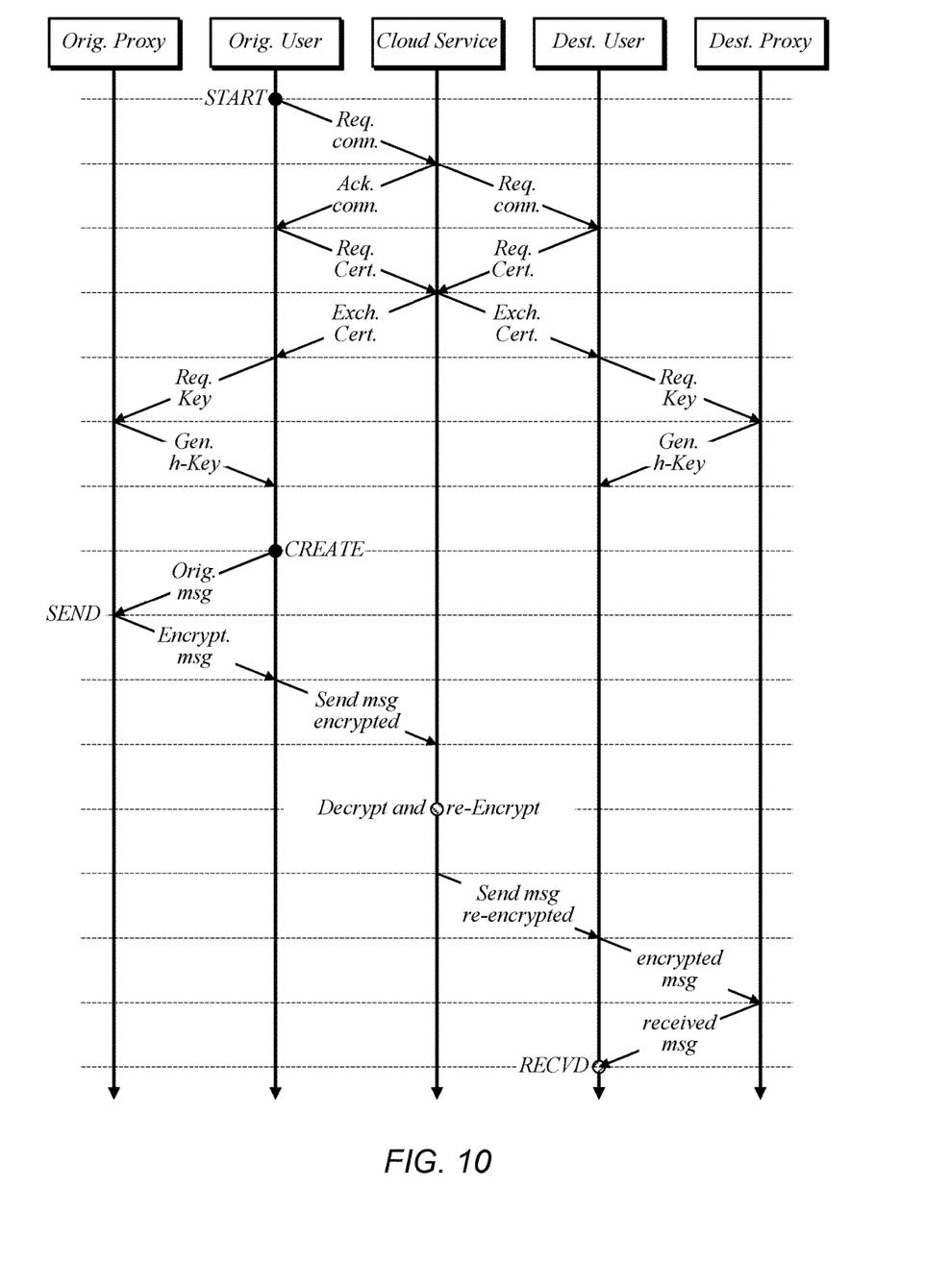
FIG. 10 shows a time sequence diagram with HxE embedded with proxy.

In this cryptosystem, the generation key is a requirement between the transmitter and the receiver. As otherwise, both chaotic oscillators will not be in sync. The result of the encryption scheme can be seen in FIG. 8.

A more complex chaotic behavior of the Chua's circuit can be obtained by modifying the Chua's diode characteristic. In the digital counterpart this is equal to modifying the function f(x), defined by the equation 10. More complex signals or even more attractors can be achieved by adding several additional segments of the Chua's diode characteristic which is in such cases described by the following function:

$$f(x) = m_1 x + \frac{1}{2} \sum (m_{i-1} - m_1)(|x + c_i| - |x - c_i|) \quad (11)$$

Here $c_i$ is the breakpoint of i-th segment and $m_i$ is the slope of i-th segment of the piecewise-linear characteristic f(x). This allows us the oscillator dynamics to be modified to obtain n-scroll chaotic attractors with the Chua's circuit.

More complex attractors also represent more complex time waveforms of voltages and currents in the Chua's circuit, and more chaotic pseudo-random sequence in the digital counterpart. Different attractors can be obtained by choosing appropriate breakpoints and slopes of the characteristics f(x) and with suitable parameters and initial conditions.

Most analog chaos-based cryptosystems are based on a single communication channel between the sender and the receiver, which is used to transmit the driving signal and the encrypted message to achieve synchronization between the slave and master systems. A possible improvement to this approach is to use two communication channels to enhance security, where one channel is used for synchronization and the other is for encryption. In our invention, we don't need the second channel for synchronization. Our synchronization is performed virtually. The generation key is used to create a synchronized (with relative time) signal. So the decryption can be performed at a later time. For example, after retrieved from storage.

The present invention which is described hereinbefore with reference to flowchart and/or block diagram illustrations of methods, systems, devices, simulations, and computer program products in accordance with some embodiments of the invention has been illustrated in detail by using a computer system. For instance, the flowchart and/or block diagrams further illustrate exemplary operations of the computer systems and methods. It is also conceivable that each block of the flowchart and/or block diagram illustrations, and combinations of blocks in the flowchart and/or block diagram illustrations, may be implemented by any computer program instructions and/or hardware. These computer program instructions may be provided to a processor of a general purpose computer, a microprocessor, a portable device such as cell phones, a special purpose computer or device, or other programmable data processing apparatus to produce a device, such that the instructions, which execute via the processor of the computer or other programmable data processing apparatus, create means for implementing the functions specified in the flowcharts and/or block diagrams or blocks. The computer program may also be supplied from a remote source embodied in a carrier medium such as an electronic signal, including a radio frequency carrier wave or an optical carrier wave. In a particular embodiment, the hybrid processor is implemented in a field-programmable gate array (FPGA) IC that simulates the chaotic oscillator, tunable from a digital computer. In another embodiment, the hybrid processor is implemented in a personal computer that simulates digitally the chaotic oscillator, tunable from a digital computer.

In addition, the encryption device can be embedded in the communication device (e.g., smart phone) or as an add-on device (proxy) that performs the encryption for the communication device. FIGS. 11 and 12 show the sequence of steps for direct (peer-to-peer) or via proxy communication methods.

FIG. 11 depicts a time sequence diagram with $H_xE$ embedded in the communication device and which uses cloud services. The user originating the call starts a secure communication or, during a call, requests a secure call. The request goes to the receiving caller. After the receiving caller accepts the request, the devices contact the server for the specific connection keys. The server exchanges the appropriate certificates and "keys" to each caller. The system is ready for use. One of the users (in the case shown, the Originator User) starts a transmission (voice, data, media, etc.) to the $H_xE$. The $H_xE$ encrypts the data within the transmission and then sends it to the cloud service. The service decrypts the encrypted message received with the originator's key and then re-encrypts the message with the destinator's key and sends it to the Destinator User. The receiver receives the "re-encrypted" message and the receiver's embedded HxE decrypts the re-encrypted message with their private keys and the cloud service public keys and delivers the message to the Destinator.

FIG. 12 depicts a time sequence diagram with a wearable device that contains the hardware encryption. The user originating the call (the Originator User) starts a secure communication or, during a call, requests a secure call. The request goes to the receiving caller (Destinator User). After the Destinator User accepts the request, the devices contact the server for the specific connection keys. The server connects to each caller and the caller device connects to the wearable device with the HxE hardware (e.g., a BLE device, called here proxy). The Originator User and/or the Destinator User may need to approve the requested service. An exchange between the cloud service and the proxy hardware of each callers devices is used to establish the specific connection keys. The server exchanges the appropriate certificates and "keys" to each caller. Each device gets the appropriate chaotic circuit going with the corresponding generation keys. The system is ready. One of the users (in the case shown, the Originator User) starts a transmission (voice, data, media, etc.) and sends the info (message) to be transmitted to its proxy's HxE that in turns encrypts it and then sends it to the cloud service. The service decrypts the encrypted message received with the originator's key and then re-encrypts the message with the Destinator's key and sends it to Destinator. The receiver receives the "re-encrypted" message and its proxy's HxE decrypts it with the Destinator's keys and the cloud service public keys and delivers the message to the user.

Additionally, other encryption methods, such as Needham-Schroeder, PGP, IDEA, AES, RAS, etc. maybe be used in conjunction with the disclosures herein.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system of paired circuits that create substantially identical chaotic or preprogrammed analog oscillators that are digitally tunable comprising:
   one or more chaotic oscillators comprising a hybrid chaotic oscillation circuit comprising digital elements and a processor coupled to the digital elements, wherein the operating parameters of the one or more hybrid chaotic oscillators are tunable via the digital elements using the processor, and wherein the operating parameters of the one or more chaotic oscillators are stored in a generation key,
   an encryption device which encrypts information to be sent or stored, wherein the information is encrypted using an encryption key generated by the one or more hybrid chaotic oscillators using the generation key;
   a decryption device which decrypts the encrypted information which is sent or stored, wherein the information is decrypted using signals generated by the one or more hybrid chaotic oscillators using the generation key;
   wherein the encryption key is a mantissa and exponent part of a digital part of a real number generated by the chaotic oscillator at predetermined times.

2. The system of claim 1, wherein the hybrid chaotic oscillation circuit comprises: a plurality of energy-storage elements; one or more active resistors; and a non-linear element; wherein operating parameters of the non-linear element are digitally tunable by the processor.

3. The system of claim 2, wherein the non-linear element is a Chua's diode characterized a set of Chua's equations, wherein the operating parameters controlled by the processor represent parameters of the Chua's equations.

4. The system of claim 3, wherein the Chua's equations are defined by a set of differential or difference equations wherein the differential or difference equations are selectable by the digital elements.

5. The system of claim 3, wherein the Chua's equations are represented by a hybrid integrated circuit, wherein the coefficients of the Chua's equations are varied according to the processor.

6. The system of claim 1, wherein the processor monitors the operation of the chaotic oscillation circuit and stores information related to the number of resets that occur.

7. The system of claim 2, wherein the generation key includes initial conditions of chaotic oscillation circuit, characteristics of the nonlinear elements, reset thresholds, and/or delays.

8. The system of claim 1, wherein the generation key comprises one or more of the following: chaotic oscillator type, equations co-efficients, initial conditions, reset thresholds, nonlinearities, and ephemeral information.

9. The system of claim 1, wherein the encryption device combines the different states of the one or more chaotic oscillators with different weights at different times to produce the encryption key.

10. The system of claim 1, wherein the digital elements are configured to receive external signals, wherein information regarding the external signals is stored in the generation key.

11. The system of claim 1, wherein the one or more chaotic oscillators comprises nonlinearities that are digitally tunable via the digital elements.

12. The system of claim 1, wherein initial operating parameters of the one or more chaotic oscillators are digitally tunable and resettable via the digital elements.

13. The system of claim 1, wherein the encryption key is created based on one or more of: voltages; currents; phases, or frequencies of a signal produced by the one or more chaotic oscillators.

14. The system of claim 1, wherein one or more of the chaotic oscillators comprise an analog integrator which integrates a signal produced by one or more of the chaotic oscillators, wherein the integrated signal is used to create the encryption key.

15. A method of transmitting encrypted data comprising:
   sending data to an encryption system, wherein the encryption system comprises:
      an encryption tunable chaotic oscillator; and
      an encryption device which produces encrypted data;
   encrypting the data using the encryption system by combining the data with an encryption key generated from chaotic signals produced by the tunable chaotic oscillator, wherein the chaotic signals are produced under operating parameters which are stored in a generation key sending the encrypted data and the generation key to a decryption system, wherein the decryption system comprises:
 a decryption tunable chaotic oscillator capable of producing chaotic signals substantially identical to the chaotic signals produced by the encryption tunable chaotic oscillator when operating under the operating parameters stored in a generation key; and
 a decryption device which removes the encryption key from the encrypted data; and removing the encryption key from the encrypted data to obtain a copy of the sent data;

wherein the generation key is stored in a cloud-based server coupled to the encryption system and the decryption system.

16. A method of transmitting encrypted data comprising:

sending data to an encryption system, wherein the encryption system comprises:
 an encryption tunable chaotic oscillator; and
 an encryption device which produces encrypted data;

encrypting the data using the encryption system by combining the data with an encryption key generated from chaotic signals produced by the tunable chaotic oscillator, wherein the chaotic signals are produced under operating parameters which are stored in a generation key sending the encrypted data and the generation key to a decryption system, wherein the decryption system comprises:
 a decryption tunable chaotic oscillator capable of producing chaotic signals substantially identical to the chaotic signals produced by the encryption tunable chaotic oscillator when operating under the operating parameters stored in a generation key; and
 a decryption device which removes the encryption key from the encrypted data to produce the data being transmitted; and removing the encryption key from the encrypted data to obtain the unencrypted data;

wherein the encryption system and the decryption system are embodied in a cloud-based server, and wherein the cloud-based server connects a transmitter of the data with a receiver of the data.

17. A system of paired circuits capable of creating substantially identical chaotic or preprogrammed analog oscillators that are digitally tunable comprising:
 one or more chaotic oscillators comprising a hybrid chaotic oscillation circuit comprising digital elements and a processor coupled to the digital elements, wherein the operating parameters of the one or more hybrid chaotic oscillators are tunable via the digital elements using the processor, and wherein the operating parameters of the one or more chaotic oscillators are stored in a generation key, wherein part of the generating key is hardwired into the one or more chaotic oscillators at manufacturing,
 an encryption device which encrypts information to be sent or stored, wherein the information is encrypted using an encryption key generated by the one or more hybrid chaotic oscillators using the generation key;
 a decryption device which decrypts the encrypted information which is sent or stored, wherein the information is decrypted using signals generated by the one or more hybrid chaotic oscillators using the generation key.

* * * * *